US 9,621,083 B2

(12) United States Patent
Nakajima et al.

(10) Patent No.: US 9,621,083 B2
(45) Date of Patent: Apr. 11, 2017

(54) CONTROL DEVICE FOR AC ROTATING MACHINE, AC ROTATING MACHINE DRIVE SYSTEM EQUIPPED WITH CONTROL DEVICE FOR AC ROTATING MACHINE AND ELECTRIC POWER STEERING SYSTEM

(71) Applicants: Shunsuke Nakajima, Tokyo (JP); Yoshihiko Kimpara, Tokyo (JP)

(72) Inventors: Shunsuke Nakajima, Tokyo (JP); Yoshihiko Kimpara, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 0 days.

(21) Appl. No.: 14/432,819

(22) PCT Filed: Nov. 22, 2012

(86) PCT No.: PCT/JP2012/080356
§ 371 (c)(1),
(2) Date: Apr. 1, 2015

(87) PCT Pub. No.: WO2014/080497
PCT Pub. Date: May 30, 2014

(65) Prior Publication Data
US 2015/0249409 A1 Sep. 3, 2015

(51) Int. Cl.
H02P 6/18 (2016.01)
H02P 21/18 (2016.01)

(52) U.S. Cl.
CPC ............... H02P 6/18 (2013.01); H02P 6/181 (2013.01); H02P 6/183 (2013.01); H02P 21/18 (2016.02)

(58) Field of Classification Search
CPC .. H02P 6/18; H02P 6/181; H02P 21/18; H02P 6/183
See application file for complete search history.

(56) References Cited

U.S. PATENT DOCUMENTS 5,872,710 A * 2/1999 Kameyama ....... H02M 7/53875
363/131
5,886,491 A * 3/1999 Yoshida ............... G05B 13/024
318/568.17
(Continued)

FOREIGN PATENT DOCUMENTS

JP 3312472 B2 8/2002
JP 2010-11709 A 1/2010
(Continued)

OTHER PUBLICATIONS

International Search Report for PCT/JP2012/080356 dated Feb. 26, 2013.
(Continued)

Primary Examiner — Shawki S Ismail
Assistant Examiner — Muhammad S Islam
(74) Attorney, Agent, or Firm — Sughrue Mion, PLLC; Richard C. Turner

(57) ABSTRACT

There are provided the control device for an AC rotating machine, and the AC rotating machine drive system and an electric power steering system including the control device for an AC rotating machine, which are capable of supplying high-frequency powers, on which high-frequency components corresponding to high-frequency signals input thereto are superimposed, to the AC rotating machine, and calculating a rotational position of the AC rotating machine based on a phase difference between an output torque high frequency contained in an output torque of the AC rotating machine and the high-frequency signals to estimate the rotational position of the AC rotating machine without being constrained by a rotational speed of the AC rotating machine, whether or not the AC rotating machine is electrically salient, and whether or not magnetic saturation has occurred.

15 Claims, 5 Drawing Sheets

(56) References Cited

U.S. PATENT DOCUMENTS

| | | | |
|---|---|---|---|
| 5,977,741 A * | 11/1999 | DeLange | 318/801 |
| 7,202,622 B2 * | 4/2007 | Eskritt | B62D 5/065 |
| | | | 318/400.24 |
| 7,541,769 B2 * | 6/2009 | Nawa | H02M 7/53875 |
| | | | 318/632 |
| 2002/0060548 A1 | 5/2002 | Iwaji et al. | |
| 2003/0102839 A1 | 6/2003 | Kinpara et al. | |
| 2003/0169015 A1 * | 9/2003 | Royak | H02P 21/141 |
| | | | 318/727 |
| 2005/0024009 A1 | 2/2005 | Kinpara et al. | |
| 2009/0039810 A1 | 2/2009 | Gotz et al. | |
| 2009/0140676 A1 * | 6/2009 | Son | H02P 21/0039 |
| | | | 318/400.04 |
| 2009/0184598 A1 * | 7/2009 | Nakano | G01D 5/2046 |
| | | | 310/156.78 |
| 2011/0098888 A1 | 4/2011 | Kariatsumari et al. | |
| 2011/0163704 A1 * | 7/2011 | Wang | F04B 17/03 |
| | | | 318/400.21 |
| 2011/0234135 A1 | 9/2011 | Kato et al. | |
| 2012/0001581 A1 * | 1/2012 | Sumita | H02P 21/0003 |
| | | | 318/490 |
| 2012/0206077 A1 | 8/2012 | Yoneshima et al. | |
| 2014/0001908 A1 * | 1/2014 | Yamaguchi | H02P 6/183 |
| | | | 310/156.08 |
| 2014/0145660 A1 * | 5/2014 | Shimada | H02P 21/0039 |
| | | | 318/400.33 |

FOREIGN PATENT DOCUMENTS

| | | |
|---|---|---|
| JP | 2010-178609 A | 8/2010 |
| JP | 4632157 B2 | 2/2011 |
| JP | 4672236 B2 | 4/2011 |

OTHER PUBLICATIONS

Communication dated Jun. 21, 2016 issued by the European Patent Office in counterpart application No. 12888880.7.

* cited by examiner

CONTROL DEVICE FOR AC ROTATING MACHINE, AC ROTATING MACHINE DRIVE SYSTEM EQUIPPED WITH CONTROL DEVICE FOR AC ROTATING MACHINE AND ELECTRIC POWER STEERING SYSTEM

CROSS REFERENCE TO RELATED APPLICATIONS

This application is a National Stage of International Application No. PCT/JP2012/080356 filed Nov. 22, 2012, the contents of all of which are incorporated herein by reference in its entirety.

TECHNICAL FIELD

The present invention relates to a control device for an AC rotating machine, which is capable of estimating a rotational position of the AC rotating machine without using a position sensor, and an AC rotating machine drive system and an electric power steering system each including the control device for an AC rotating machine.

BACKGROUND ART

Hitherto, in a case of controlling an AC rotating machine, in order to supply an electric current in an appropriate phase corresponding to a rotational position of a rotor, a position sensor such as an encoder, a resolver, and a Hall element has been necessary. However, in the case of using such position sensor, there has been a problem in terms of price, reliability of the sensor, or the inconvenience of wiring.

Therefore, in order to solve such problem, there has been proposed a control device for controlling the AC rotating machine by estimating the rotational position of the rotor without using the position sensor.

Specific examples of such control device for an AC rotating machine in the related art include a control device in which a rotational speed of the AC rotating machine is estimated by an adaptive observer based on an induced voltage of the AC rotating machine, and the estimated rotational speed is integrated by an integrator to estimate the rotational position (see, for example, Patent Literature 1).

Another example is a control device in which a difference in inductance in components on arbitrary two rotational axes of an AC rotating machine that is electrically salient, which results from saliency that is generated in a case where high-frequency voltages are applied on the two rotational axes, is used to estimate the rotational position (see, for example, Patent Literature 2).

Still another example is a control device in which a difference in inductance, which results from magnetic saturation that occurs in a case where high-frequency voltages are applied on arbitrary two rotational axes of an AC rotating machine, is used to estimate the rotational position (see, for example, Patent Literature 3).

CITATION LIST

Patent Literature

[PTL 1] JP 4672236 B2
[PTL 2] JP 3312472 B2
[PTL 3] JP 4632157 B2

SUMMARY OF INVENTION

Technical Problem

However, the related art has the following problems.

In the related art described in Patent Literature 1, the rotational speed and the rotational position are estimated based on the induced voltage of the AC rotating machine, and the induced voltage of the AC rotating machine is generated in proportion to the rotational speed of the AC rotating machine. Therefore, there have been problems in that, in an area in which the rotational speed is low, the induced voltage becomes small and hence the rotational position cannot be estimated accurately, and in that, in a case where the AC rotating machine is stopped, the induced voltage is not generated and hence, in principle, the rotational position cannot be estimated.

Moreover, in the related art described in Patent Literature 2, the rotational position is estimated based on the difference in inductance of the AC rotating machine that is electrically salient. Therefore, in a case of a cylindrical AC rotating machine that is not salient, there has been a problem in that the rotational position cannot be estimated.

Moreover, in the related art described in Patent Literature 3, the rotational position is estimated based on the difference in inductance of the AC rotating machine due to the magnetic saturation. Therefore, there have been problems in that there is a need to supply a sufficiently large electric current to the AC rotating machine so that the magnetic saturation occurs, and that in a case of a power supply state in which the magnetic saturation does not occur, the rotational position cannot be estimated. Further, there has been a problem in that, in an area in which the magnetic saturation occurs, a change in rotational flux in response to a change in electric current becomes nonlinear, and hence it is not easy to control the AC rotating machine.

The present invention has been made in order to solve the above-mentioned problems, and therefore has an object to provide a control device for an AC rotating machine, which is capable of estimating a rotational position of the AC rotating machine without being constrained by a rotational speed of the AC rotating machine, whether or not the AC rotating machine is electrically salient, and whether or not magnetic saturation has occurred, and an AC rotating machine drive system and an electric power steering system each including the control device for an AC rotating machine.

Solution to Problems

According to one embodiment of the present invention, there is provided a control device for an AC rotating machine, including: the AC rotating machine; a power supply unit for supplying electric powers to the AC rotating machine; a torque detection unit for detecting an output torque of the AC rotating machine; and a rotational position estimation unit for estimating a rotational position of the AC rotating machine, in which the power supply unit adds predetermined high-frequency powers to desired electric powers to be supplied to the AC rotating machine, and in which the rotational position estimation unit estimates the rotational position based on a high-frequency component contained in the output torque and high-frequency components corresponding to the high-frequency powers.

Advantageous Effects of Invention

According to one embodiment of the present invention, high-frequency powers, on which high-frequency components corresponding to high-frequency signals input thereto are superimposed, may be supplied to the AC rotating machine, and the rotational position of the AC rotating machine may be computed based on a phase difference between an output torque high frequency contained in an output torque of the AC rotating machine and the high-frequency signals. In this manner, there may be provided the control device for an AC rotating machine, which is capable of estimating the rotational position of the AC rotating machine without being constrained by the rotational speed of the AC rotating machine, whether or not the AC rotating machine is electrically salient, and whether or not the magnetic saturation has occurred, and the AC rotating machine drive system and the electric power steering system each including the control device for an AC rotating machine.

DESCRIPTION OF EMBODIMENTS

Hereinafter, a description is given of preferred embodiments of a control device for an AC rotating machine, and an AC rotating machine drive system and an electric power steering system each including the control device for an AC rotating machine according to the present invention with reference to the drawings. Note that, in the description of the drawings, like elements are denoted by like reference symbols, and a duplicate description thereof is omitted.

First Embodiment

Figure 1:
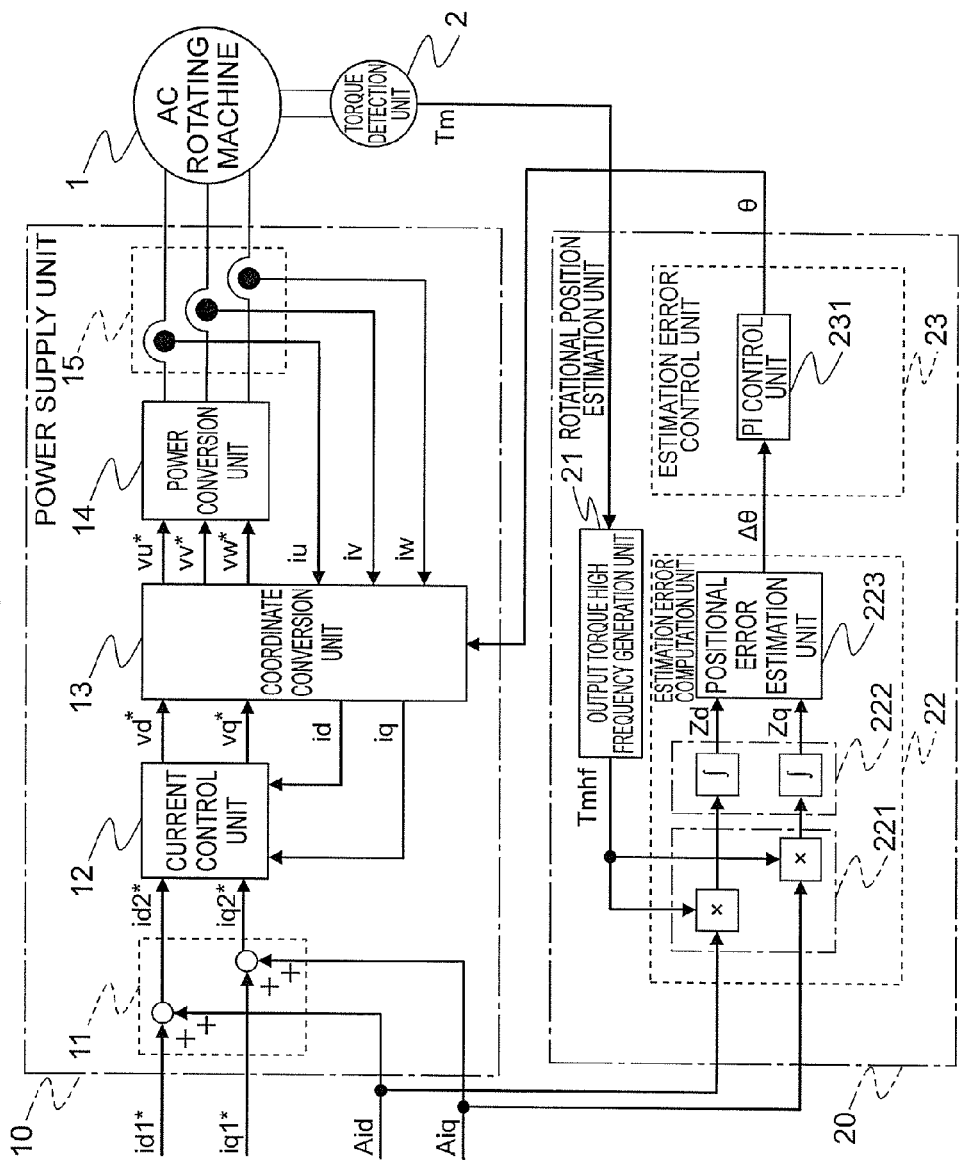
FIG. 1 is a configuration diagram illustrating a control device for an AC rotating machine according to a first embodiment of the present invention.

FIG. 1 is a configuration diagram illustrating a control device for an AC rotating machine according to a first embodiment of the present invention. In FIG. 1, an AC rotating machine 1 to be controlled and a torque detection unit 2 are illustrated along with the control device for an AC rotating machine.

The control device for an AC rotating machine in the first embodiment includes a power supply unit 10 and a rotational position estimation unit 20. Moreover, the AC rotating machine 1 is supplied with high-frequency powers from the power supply unit 10, and the torque detection unit 2 detects an output torque Tm output by the AC rotating machine 1. Note that, the term "high-frequency powers" as used in the detailed description of the invention means electric powers obtained by superimposing high-frequency components on electric powers supplied from the power supply unit 10 to the AC rotating machine 1 without affecting the control on the rotation of the AC rotating machine 1.

Note that, in the following description, first and second axes on two rotational axes of the AC rotating machine 1 are represented as follows for the description. More specifically, the first axis is in a direction that is in phase with a magnetic flux of a rotor of the AC rotating machine 1 and represented by a d axis, and the second axis is in a direction orthogonal to the first axis and represented by a q axis.

Here, the first embodiment has the following technical features.

(Feature 1) The power supply unit 10 supplies, based on reference command signals, high-frequency signals, and a rotational position computed by the rotational position estimation unit 20, the high-frequency powers, on which the high-frequency components corresponding to the high-frequency signals are superimposed, to the AC rotating machine 1.

(Feature 2) The rotational position estimation unit 20 extracts, as an output torque high frequency, a high-frequency component from the output torque of the AC rotating machine 1 supplied with the high-frequency powers, and computes the rotational position based on the output torque high frequency and the high-frequency signals.

Hereinafter, the above-mentioned technical features are described in detail.

First, the power supply unit 10 is described. Here, for a description with specific examples, the following case is assumed. That is, the reference command signals input from the outside to the power supply unit 10 include a d-axis current command id1* as a d-axis reference command signal and a q-axis current command iq1* as a q-axis reference command signal. Moreover, the high-frequency signals input to the power supply unit 10 include a d-axis high-frequency current Aid as a d-axis high-frequency signal and a q-axis high-frequency current Aiq as a q-axis high-frequency signal. Further, a case where three-phase AC voltages, on which the high-frequency components corresponding to the high-frequency signals are superimposed, are applied as the high-frequency powers supplied from the power supply unit 10 to the AC rotating machine 1 is assumed.

Note that, the d-axis current command id1* and the q-axis current command iq1* represent a d-axis component and a q-axis component in current commands on the d-q axes. Similarly, the d-axis high-frequency current Aid and the q-axis high-frequency current Aiq represent the d-axis component and the q-axis component in high-frequency currents on the d-q axes.

To the power supply unit 10, the d-axis current command id1* and the q-axis current command iq1* are input from a reference command signal generation unit (not shown), and the d-axis high-frequency current Aid and the q-axis high-frequency current Aiq are input from a high-frequency signal generation unit (not shown).

Moreover, the power supply unit 10 applies the three-phase AC voltages, which are generated based on the d-axis current command id1* and the q-axis current command iq1*, on the d-axis high-frequency current Aid and the q-axis high-frequency current Aiq, and on a rotational position θ computed by the rotational position estimation unit 20, to the AC rotating machine 1. Note that, the term "rotational position θ" as used herein means the rotational position of the rotor of the AC rotating machine 1.

Moreover, the power supply unit 10 includes a high-frequency superimposing unit 11, a current control unit 12, a coordinate conversion unit 13, a power conversion unit 14, and a current detection unit 15.

The high-frequency superimposing unit 11 generates a d-axis high-frequency superimposed current command id2\* by superimposing (adding) the d-axis current command id1\* and the d-axis high-frequency current Aid, and outputs the d-axis high-frequency superimposed current command id2\* to the current control unit 12. Moreover, the high-frequency superimposing unit 11 similarly generates a q-axis high-frequency superimposed current command iq2\* by superimposing the q-axis current command iq1\* and the q-axis high-frequency current Aiq, and outputs the q-axis high-frequency superimposed current command iq2\* to the current control unit 12.

Here, the d-axis high-frequency current Aid and the q-axis high-frequency current Aiq are sine waves which have the same amplitude and the same frequency and are orthogonal to each other as expressed by Expression (1). Moreover, of parameters in Expression (1), A represents an amplitude of a high frequency, wh represents an angular frequency of the high frequency, and t represents time.

$$Aid = A\cos(wh \times t)$$
$$Aiq = A\sin(wh \times t) \quad (1)$$

Moreover, the d-axis high-frequency current Aid and the q-axis high-frequency current Aiq are used by the rotational position estimation unit 20 to compute the rotational position θ. Further, the amplitude A is set to be sufficiently small without affecting the control on the rotation of the AC rotating machine 1.

Moreover, the angular frequency wh is set so that an output torque high frequency Tmhf, which is obtained by extracting the high-frequency component (that is, the angular frequency wh component) from the output torque Tm detected by the torque detection unit 2, is based only on the d-axis high-frequency current Aid and the q-axis high-frequency current Aiq. In other words, the angular frequency wh is set to be a value that is sufficiently larger (a value that is a predetermined times larger) than frequency components contained in the d-axis current command id1\* and the q-axis current command iq1\*.

Note that, the amplitude A and the angular frequency wh set specifically are different depending on the use of the AC rotating machine 1.

Moreover, in the first embodiment, the case where the d-axis high-frequency current Aid and the q-axis high-frequency current Aiq are the sine waves which have the same amplitude and the same frequency and are orthogonal to each other is described as an example, but the d-axis high-frequency current Aid and the q-axis high-frequency current Aiq are not limited to the sine waves. More specifically, the d-axis high-frequency current Aid and the q-axis high-frequency current Aiq may be, for example, waves having a different shape such as trapezoidal waves, rectangular waves, triangular waves, or sawtooth waves, and the waves may be of any type. Further, amplitudes of the d-axis high-frequency current Aid and the q-axis high-frequency current Aiq are not necessarily the same, and similar effects may be obtained even in a case where the d-axis high-frequency current and the q-axis high-frequency current having different amplitudes are superimposed.

The current control unit 12 generates a d-axis voltage command vd\* and a q-axis voltage command vq\* so that the d-axis high-frequency superimposed current command id2\* and the q-axis high-frequency superimposed current command iq2\*, which are output by the high-frequency superimposing unit 11, and a d-axis detected current id and a q-axis detected current iq, which are output by the coordinate conversion unit 13, match in terms of axial components.

The coordinate conversion unit 13 subjects a u-phase detected current iu, a v-phase detected current iv, and a w-phase detected current iw, which are detected by the current detection unit 15, to coordinate conversion based on the rotational position θ, which is computed by the rotational position estimation unit 20, to generate the d-axis detected current id and the q-axis detected current iq, and outputs the d-axis detected current id and the q-axis detected current iq to the current control unit 12. Further, the coordinate conversion unit 13 subjects the d-axis voltage command vd\* and the q-axis voltage command vq\*, which are output by the current control unit 12, to the coordinate conversion based on the rotational position θ, which is computed by the rotational position estimation unit 20, to generate a u-phase voltage command vu\*, a v-phase voltage command vv\*, and a w-phase voltage command vw\*.

The power conversion unit 14 supplies to the AC rotating machine 1 the high-frequency powers, on which the high-frequency components corresponding to the d-axis high-frequency current Aid and the q-axis high-frequency current Aiq are superimposed. In other words, the power conversion unit 14 applies to the AC rotating machine 1 the three-phase AC voltages that are based on the u-phase voltage command vu\*, the v-phase voltage command vv\*, and the w-phase voltage command vw\*, which are output by the coordinate conversion unit 13. In the case where the power conversion unit 14 applies the three-phase AC voltages to the AC rotating machine 1, the current detection unit 15 detects the u-phase detected current iu, the v-phase detected current iv, and the w-phase detected current iw as currents flowing in the respective phases.

In this manner, the power supply unit 10 supplies the high-frequency powers to the AC rotating machine 1 based on the d-axis current command id1\* and the q-axis current command iq1\*, on the d-axis high-frequency current Aid and the q-axis high-frequency current Aiq, and on the rotational position θ computed by the rotational position estimation unit 20.

Moreover, the d-axis high-frequency superimposed current command id2\* and the q-axis high-frequency superimposed current command iq2\* are not the current commands on the d-q axes corresponding to an actual rotational position of the AC rotating machine 1 (hereinafter referred to as "on the actual d-q axes"), but current commands on the d-q axes corresponding to the rotational position computed by the rotational position estimation unit 20 (hereinafter referred to as "on the estimated d-q axes"). Therefore, the d-axis high-frequency superimposed current command id2\* and the q-axis high-frequency superimposed current command iq2\* are applied to the AC rotating machine 1 with a shift of a phase difference between the actual d-q axes and the estimated d-q axes.

Next, the rotational position estimation unit 20 is described in detail. To the rotational position estimation unit 20, the output torque Tm is input from the torque detection unit 2, and the d-axis high-frequency current Aid and the q-axis high-frequency current Aiq are input from a high-frequency signal generation unit (not shown). Here, the output torque Tm input to the rotational position estimation unit 20 is a torque output by the AC rotating machine 1 supplied with the high-frequency powers. Therefore, the output torque Tm contains the high-frequency component corresponding to the d-axis high-frequency current Aid and the q-axis high-frequency current Aiq.

Moreover, the rotational position estimation unit 20 includes an output torque high frequency generation unit 21, an estimation error computation unit 22, and an estimation error control unit 23. Further, the estimation error computation unit 22 includes a multiplication unit 221, an integration unit 222, and a positional error estimation unit 223, and the estimation error control unit 23 includes a PI control unit 231.

The output torque high frequency generation unit 21 extracts the output torque high frequency Tmhf corresponding to the high-frequency component contained in the output torque Tm based on the output torque Tm detected by the torque detection unit 2. In other words, the output torque high frequency generation unit 21 extracts only a signal near the angular frequency wh of the d-axis high-frequency current Aid and the q-axis high-frequency current Aiq to generate the output torque high frequency Tmhf, and outputs the output torque high frequency Tmhf to the estimation error computation unit 22. Note that, the output torque high frequency generation unit 21 may include, for example, a bandpass filter.

Moreover, the estimation error computation unit 22 computes a rotational position estimation error $\Delta\theta$ based on the d-axis high-frequency current Aid and the q-axis high-frequency current Aiq, and on the output torque high frequency Tmhf. Note that, the term "rotational position estimation error $\Delta\theta$" as used herein means the phase difference between the actual d-q axes and the estimated d-q axes.

The multiplication unit 221 multiplies the d-axis high-frequency current Aid and the q-axis high-frequency current Aiq respectively by the output torque high frequency Tmhf output by the output torque high frequency generation unit 21 to compute a product Pd corresponding to the d axis and a product Pq corresponding to the q axis, and outputs the product Pd and the product Pq to the integration unit 222.

The integration unit 222 integrates the product Pd and the product Pq, which are output by the multiplication unit 221, respectively with respect to time over an interval corresponding to N (N is an integer that is equal to or larger than 1) times a period of the d-axis high-frequency current Aid and the q-axis high-frequency current Aiq to compute a d-axis correlation value Zd and a q-axis correlation value Zq, and outputs the d-axis correlation value Zd and the q-axis correlation value Zq to the positional error estimation unit 223.

The positional error estimation unit 223 computes an arc tangent of a division value (Zd/Zq) obtained by dividing the d-axis correlation value Zd, which is output by the integration unit 222, by the q-axis correlation value Zq to compute the rotational position estimation error $\Delta\theta$, and outputs the rotational position estimation error $\Delta\theta$ to the estimation error control unit 23.

Moreover, the PI control unit 231 in the estimation error control unit 23 performs a control operation so that the rotational position estimation error $\Delta\theta$ output by the positional error estimation unit 223 becomes zero to compute the rotational position $\theta$, and outputs the rotational position $\theta$ to the power supply unit 10.

Note that, the estimation error control unit 23 computes the rotational position $\theta$ by the PI control unit 231. However, the present invention is not limited thereto, and another method may be used to compute the rotational position $\theta$. More specifically, for example, a computed value that is obtained in the previous computation may be corrected with the addition of the rotational position estimation error $\Delta\theta$ to compute the rotational position $\theta$.

As described above, the rotational position estimation unit 20 extracts, from the output torque Tm output by the AC rotating machine 1 supplied with the high-frequency powers, the high-frequency component as the output torque high frequency Tmhf, computes the rotational position $\theta$ based on the output torque high frequency Tmhf, and on the d-axis high-frequency current Aid and the q-axis high-frequency current Aiq, and feeds back (outputs) the rotational position $\theta$ to the power supply unit 10.

Figure 2:
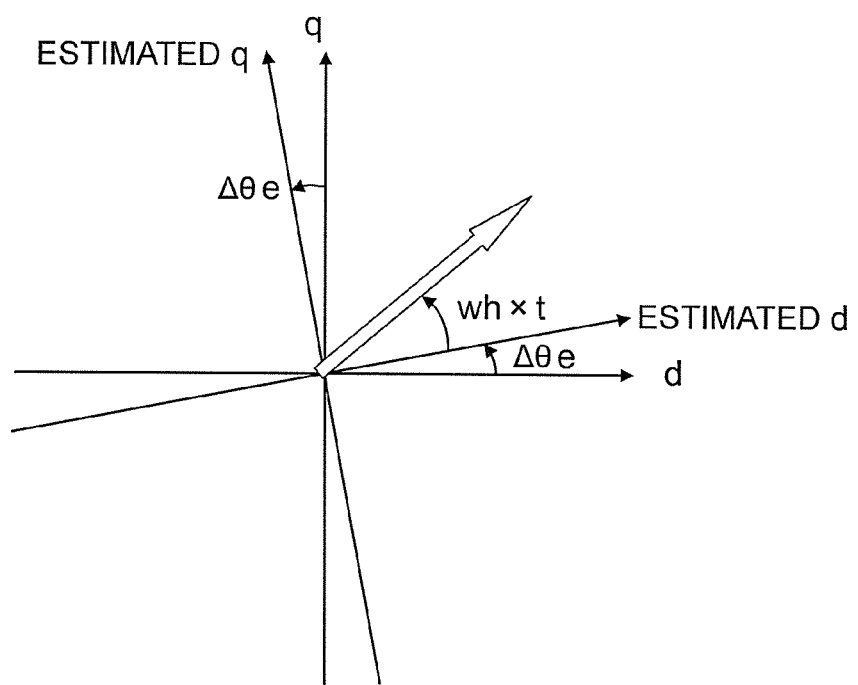
FIG. 2 is an explanatory diagram showing a phase relationship of actual d-q axes and estimated d-q axes, and of a resultant vector of high-frequency currents according to the first embodiment of the present invention.

Next, a specific computation method in the case where the rotational position estimation unit 20 computes the rotational position $\theta$ of the AC rotating machine 1 is described with reference to FIG. 2. FIG. 2 is an explanatory diagram showing a phase relationship of the actual d-q axes and the estimated d-q axes, and of a resultant vector of the high-frequency currents according to the first embodiment of the present invention.

Here, as described above, the d-axis high-frequency superimposed current command id2* and the q-axis high-frequency superimposed current command iq2* are the current commands not on the actual d-q axes but on the estimated d-q axes. Therefore, the d-axis high-frequency current Aid and the q-axis high-frequency current Aiq are superimposed on the estimated d-q axes as with the d-axis high-frequency superimposed current command id2* and the q-axis high-frequency superimposed current command iq2*.

FIG. 2 shows the phase relationship of the actual d-q axes and the estimated d-q axes, and the phase difference between those axes is referred to as "rotational position error $\Delta\theta e$". Moreover, FIG. 2 also shows the resultant vector of the high-frequency currents superimposed on the estimated d-q axes. Note that, the term "resultant vector of the high-frequency currents" as used herein means the resultant vector of the d-axis high-frequency current Aid and the q-axis high-frequency current Aiq superimposed on the estimated d-q axes.

Moreover, as can be seen from FIG. 2, as opposed to the d-axis high-frequency current Aid and the q-axis high-frequency current Aiq, which are superimposed on the estimated d-q axes, a d-axis high-frequency current Aidr and a q-axis high-frequency current Aiqr, which are superimposed on the actual d-q axes, are expressed as Expression (2) using the rotational position error $\Delta\theta e$.

$$Aidr = A\cos(wh \times t + \Delta\theta e)$$

$$Aiqr = A\sin(wh \times t + \Delta\theta e) \quad (2)$$

Moreover, in the output torque Tm detected by the torque detection unit 2, a torque Tm' corresponding to the d-axis high-frequency current Aidr and the q-axis high-frequency current Aiqr, which are superimposed on the actual d-q axes, is expressed as Expression (3). Moreover, of parameters in Expression (3), Pm represents the number of pole pairs, $\phi$ represents an induced voltage constant, and Ld and Lq represent a d-axis component and a q-axis component of inductances. Further, Pm, $\phi$, Ld, and Lq are constants representing characteristics of the AC rotating machine 1. Note that, in the output torque Tm, a description of a torque corresponding to the d-axis current command id1 and the q-axis current command iq1* is omitted.

$$Tm' = Pm\phi Aiqr + Pm(Ld - Lq)AidrAiqr = Pm\phi A\sin(wh \times t + \Delta\theta e) + \quad (3)$$
$$Pm(Ld - Lq)A\cos(wh \times t + \Delta\theta e)A\sin(wh \times t + \Delta\theta e) =$$
$$APm\phi\sin(wh \times t + \Delta\theta e) + A^2 Pm(Ld - Lq)\sin(2wh \times t + 2\Delta\theta e)$$

Moreover, as described above, the angular frequency wh of the d-axis high-frequency current Aid and the q-axis high-frequency current Aiq is set to be the value that is sufficiently larger (the value the predetermined times larger) than the frequency components contained in the d-axis current command id1* and the q-axis current command iq1*. Therefore, the output torque high frequency generation unit 21 may generate the output torque high frequency Tmhf that is based only on the d-axis high-frequency current Aid and the q-axis high-frequency current Aiq.

In other words, the output torque high frequency generation unit 21 may extract only the signal near the angular frequency wh of the d-axis high-frequency current Aid and the q-axis high-frequency current Aiq from the output torque Tm (the torque Tm' corresponding to the d-axis high-frequency current Aidr and the q-axis high-frequency current Aiqr) to generate the output torque high frequency Tmhf, which is expressed as Expression (4).

$$Tmhf = APm\phi \sin(wh \times t + \Delta\theta e) \quad (4)$$

Here, as can be seen from Expressions (1) and (4), the phase difference between the q-axis high-frequency current Aiq and the output torque high frequency Tmhf is the rotational position error $\Delta\theta e$. Moreover, the rotational position estimation error $\Delta\theta$ is equivalent to the rotational position error $\Delta\theta e$, and hence computing the rotational position error $\Delta\theta e$, which is the phase difference between the q-axis high-frequency current Aiq and the output torque high frequency Tmhf, computes the rotational position estimation error $\Delta\theta$.

Next, the multiplication unit 221 in the estimation error computation unit 22 multiplies the d-axis high-frequency current Aid, which is expressed as Expression (1), and the output torque high frequency Tmhf, which is expressed as Expression (4), to compute the product Pd corresponding to the d axis, and outputs the product Pd to the integration unit 222.

Moreover, the integration unit 222 integrates the product Pd, which is output by the multiplication unit 221, with respect to time over an interval from time t1 to time t2 as expressed by Expression (5) to compute the d-axis correlation value Zd, and outputs the d-axis correlation value Zd to the positional error estimation unit 223. Note, however, that the rotational position error Lee in Expressions (1) and (4) is equivalent to the rotational position estimation error $\Delta\theta$, and hence, as expressed by Expression (5), the rotational position error $\Delta\theta e$ is replaced by the rotational position estimation error $\Delta\theta$.

$$Zd = \int_{t1}^{t2} Aid \times Tmhf\, dt = \quad (5)$$
$$\int_{t1}^{t2} A\cos(wh \times t) \times APm\phi\sin(wh \times t + \Delta\theta)dt = \frac{\pi}{wh} A^2 Pm\phi \sin\Delta\theta$$

Note that, in order to calculate the d-axis correlation value Zd appropriately, the integration interval (interval over which the integration with respect to time is performed) only needs to be N (N is an integer that is equal to or larger than 1) times the period of the d-axis high-frequency current Aid and the q-axis high-frequency current Aiq. Here, in order to improve responsiveness of the d-axis correlation value Zd to a variation of the output torque high frequency Tmhf, it is assumed that N=1 (that is, one period). Moreover, time t2 in Expression (5) is assumed to be a current time at the time of integration operation, and time t1 is assumed to be a time expressed as Expression (6).

$$t1 = t2 - \frac{2\pi}{wh} \quad (6)$$

Moreover, the q-axis correlation value Zq is computed as expressed by Expression (7) by the multiplication unit 221 and the integration unit 222 performing operations similar to the calculation of the d-axis correlation value Zd, and is output to the positional error estimation unit 223.

$$Zq = \int_{t1}^{t2} Aiq \times Tmhf\, dt = \quad (7)$$
$$\int_{t1}^{t2} A\sin(wh \times t) \times APm\phi\sin(wh \times t + \Delta\theta)dt = \frac{\pi}{wh} A^2 Pm\phi \cos\Delta\theta$$

The positional error estimation unit 223 computes the rotational position estimation error $\Delta\theta$ by dividing the d-axis correlation value Zd, which is output by the integration unit 222, by the q-axis correlation value Zq and computing the arc tangent of the division value (Zd/Zq) as expressed by Expression (8), and outputs the rotational position estimation error $\Delta\theta$ to the estimation error control unit 23.

$$\arctan\left(\frac{Zd}{Zq}\right) = \arctan\left(\frac{\frac{\pi}{wh}A^2 Pm\phi \sin\Delta\theta}{\frac{\pi}{wh}A^2 Pm\phi \cos\Delta\theta}\right) = \arctan(\tan\Delta\theta) = \Delta\theta \quad (8)$$

As described above, the present invention has a technical feature of utilizing the characteristic that the phase difference generated between the output torque high frequency Tmhf, which is output by the output torque high frequency generation unit 21, and the d-axis high-frequency current Aid and the q-axis high-frequency current Aiq becomes equivalent to the rotational position estimation error $\Delta\theta$. Therefore, the estimation error computation unit 22 may utilize such characteristic to compute the rotational position estimation error $\Delta\theta$ by the computation method described above.

Moreover, the PI control unit 231 in the estimation error control unit 23 performs the control operation on the rotational position estimation error $\Delta\theta$, which is output by the positional error estimation unit 223, as expressed by Expression (9) to compute the rotational position $\theta$, and outputs the rotational position $\theta$ to the power supply unit 10.

$$\theta = KP\Delta\theta + KI\frac{\Delta\theta}{s} \quad (9)$$

Note that, in Expression (9), s represents a Laplace operator, KP represents a constant of proportionality, and KI represents a constant of integration. Moreover, the constant of proportionality KP and the constant of integration KI need to be set so that the PI control unit 231 performs the control operation so that the rotational position estimation error Δθ becomes zero to compute the rotational position θ.

As described above, the rotational position estimation unit 20 may compute the rotational position θ based on the output torque Tm in the case where the d-axis high-frequency current Aid and the q-axis high-frequency current Aiq are superimposed on the estimated d-q axes, and on the d-axis high-frequency current Aid and the q-axis high-frequency current Aiq to estimate, as a result, the rotational position θ accurately without using a position sensor.

Here, the output torque high frequency Tmhf corresponding to the d-axis high-frequency current Aid and the q-axis high-frequency current Aiq is generated without being affected by the number of revolutions of the AC rotating machine 1. Therefore, the rotational position estimation unit 20 may estimate the rotational position θ accurately regardless of the number of revolutions of the AC rotating machine 1, and in particular, may estimate the rotational position θ more accurately in a case where the rotor has a low number of revolutions or is stopped.

Moreover, even in a case where the AC rotating machine 1 is cylindrical (in other words, a case where the inductances Ld and Lq of the AC rotating machine 1 match), the output torque high frequency Tmhf, which is extracted from the torque Tm' expressed as Expression (3), is expressed as Expression (4). Therefore, the rotational position estimation unit 20 may estimate the rotational position θ accurately regardless of whether or not the AC rotating machine 1 is salient.

Moreover, the output torque high frequency Tmhf corresponding to the d-axis high-frequency current Aid and the q-axis high-frequency current Aiq is generated regardless of whether or not magnetic saturation has occurred in the AC rotating machine 1. Therefore, the rotational position estimation unit 20 may estimate the rotational position θ accurately regardless of whether or not the magnetic saturation has occurred in the AC rotating machine 1.

Here, the first embodiment adopts the configuration in which, as described above, by utilizing the characteristic that the phase difference generated between the output torque high frequency Tmhf, and the d-axis high-frequency current Aid and the q-axis high-frequency current Aiq becomes equivalent to the rotational position estimation error Δθ, the rotational position computation unit 20 performs the computation as expressed by the expression to estimate the rotational position θ. Moreover, the first embodiment has the technical feature of utilizing the characteristic that the phase difference becomes equivalent to the rotational position estimation error Δθ. Therefore, the specific computation method described in the first embodiment is merely an example for computing the phase difference, and the present invention is not limited thereto. In other words, any computation method may be employed as long as the phase difference may be computed.

Next, operation examples other than the above-mentioned operation in the control device for an AC rotating machine are described. The operation of the control device for an AC rotating machine is not limited to the above-mentioned operation, and similar effects may be obtained also by configuring the control device for an AC rotating machine to perform the following operations.

Operation Example 1

As described above, the current control unit 12 computes the d-axis voltage command vd* and the q-axis voltage command vq* so that the d-axis high-frequency superimposed current command id2* and the q-axis high-frequency superimposed current command iq2*, and the d-axis detected current id and the q-axis detected current iq match. Therefore, the d-axis high-frequency superimposed current command id2* and the q-axis high-frequency superimposed current command iq2*, and the d-axis detected current id and the q-axis detected current iq are equivalent.

Therefore, a configuration may be employed in which, instead of being input with the d-axis high-frequency current Aid and the q-axis high-frequency current Aiq, the rotational position estimation unit 20 is input with a d-axis high-frequency detected current Aid' and a q-axis high-frequency detected current A q', which are generated by extracting signals near the angular frequency wh of the d-axis detected current id and the q-axis detected current iq. Then, the rotational position estimation unit 20 may compute the rotational position θ similarly based on the output torque Tm, and on the d-axis high-frequency detected current Aid' and the q-axis high-frequency detected current Aiq'.

Note, however, that when the d-axis high-frequency detected current Aid' and the q-axis high-frequency detected current Aiq' are generated, there is a possibility that an amount of computation increases by the generation. Therefore, in a case where a consideration is given to an arithmetic processing load, it is preferred that, as described above, the rotational position estimation unit 20 use the d-axis high-frequency current Aid and the q-axis high-frequency current Aiq to compute the rotational position θ.

Operation Example 2

The control device for an AC rotating machine in the first embodiment uses currents as the high-frequency powers that are superimposed in the power supply unit 10 and the high-frequency powers used for the computation in the rotational position estimation unit 20, but voltages may be used instead. For example, instead of the d-axis high-frequency current Aid and the q-axis high-frequency current Aiq, high-frequency voltages may be used as the d-axis high-frequency signal and the q-axis high-frequency signal to compute the rotational position C.

In other words, a configuration may be employed in which, instead of superimposing the d-axis high-frequency current Aid and the q-axis high-frequency current Aiq on the d-axis current command id1* and the q-axis current command iq1*, the power supply unit 10 superimposes a d-axis high-frequency voltage Avd and a q-axis high-frequency voltage Avq on the d-axis voltage command vd* and the q-axis voltage command vq*, which are output by the current control unit 12.

Moreover, a configuration may be employed in which the power supply unit 10 superimposes the d-axis high-frequency voltage Avd and the q-axis high-frequency voltage Avq on the d-axis voltage command vd* and the q-axis voltage command vq*, which are input as the d-axis reference command signal and the q-axis reference command signal. Then, the rotational position estimation unit 20 may compute the rotational position θ similarly based on the output torque Tm, and on the d-axis high-frequency voltage Avd and the q-axis high-frequency voltage Avq.

Note, however, that while the q-axis high-frequency current Aiq and the output torque high frequency Tmhf are always in phase, the phase difference between the q-axis high-frequency voltage and the output torque high frequency Tmhf does not match but increases. This is because as the number of revolutions of the AC rotating machine 1 becomes higher, a voltage component resulting from a flux linkage in a d-axis direction becomes larger.

Therefore, when the rotational position estimation unit 20 uses the d-axis high-frequency voltage Avd and the q-axis high-frequency voltage Avq to compute the rotational position $\theta$, there is a possibility that an error based on the phase difference is generated. Therefore, when a consideration is given to an estimation accuracy of the rotational position $\theta$, it is preferred that, as described above, the rotational position estimation unit 20 use the d-axis high-frequency current Aid and the q-axis high-frequency current Aiq to compute the rotational position $\theta$.

Operation Example 3

In the control device for an AC rotating machine 1 in the first embodiment, the high-frequency powers that are superimposed in the power supply unit 10 and the high frequencies used for the computation in the rotational position estimation unit 20 are powers in the d-axis direction and a q-axis direction, but the rotational position $\theta$ may be computed by using powers corresponding to an arbitrary coordinate system.

More specifically, for example, the power supply unit 10 may be configured to superimpose an $\alpha$-axis high-frequency current Ai$\alpha$ corresponding to an $\alpha$-axis direction and a $\beta$-axis high-frequency current Ai$\beta$ corresponding to a $\beta$-axis direction on $\alpha$-$\beta$ axes, which form a coordinate system that is at rest with respect to the AC rotating machine 1. Then, the rotational position estimation unit 20 may compute the rotational position $\theta$ based on the output torque Tm, and on the $\alpha$-axis high-frequency current Ai$\alpha$ and the $\beta$-axis high-frequency current Ai$\beta$.

In this case, the power supply unit 10 uses the rotational position $\theta$, which is output by the rotational position estimation unit 20, to subject the d-axis current command id1* and the q-axis current command iq1* on the d-q axes, which rotate in synchronization with the rotor of the AC rotating machine 1, to the coordinate conversion into an $\alpha$-axis current command i$\alpha$1* and the q-axis current command i$\alpha$1* on the $\alpha$-$\beta$ axes, to which the $\alpha$-axis high-frequency current Ai$\alpha$ and the $\beta$-axis high-frequency current Ai$\beta$ are respectively added in the high-frequency superimposing unit 11 to calculate an $\alpha$-axis high-frequency superimposed current command i$\alpha$2* and a $\beta$-axis high-frequency superimposed current command i$\alpha$2. The d-axis high-frequency superimposed current command id2* and the q-axis high-frequency superimposed current command iq2*, which are supplied to the current control unit 12, are calculated by using the rotational position $\theta$, which is output by the rotational position estimation unit 20, to subject the $\alpha$-axis high-frequency superimposed current command i$\alpha$2* and the $\beta$-axis high-frequency superimposed current command i$\alpha$2 to the coordinate conversion onto the d-q axes.

Moreover, in the rotational position estimation unit 20, a computation similar to that of the estimation error computation unit 22 may be performed to calculate the phase difference between the $\alpha$-$\beta$ axes of the rest coordinate system and the actual d-q axes. Here, the phase difference between the $\alpha$-$\beta$ axes of the rest coordinate system and the actual d-q axes is nothing but the rotational position $\theta$. In other words, in this case, the computation corresponding to the estimation error control unit 23 is unnecessary, and only a computation similar to that of the estimation error computation unit 22 may calculate the rotational position $\theta$.

Moreover, for example, the power supply unit 10 may be configured to superimpose a u-phase high-frequency voltage Avu, a v-phase high-frequency voltage Avv, and a w-phase high-frequency voltage Avw, which have the phase difference of 120° to one another, on the u-phase voltage command vu*, the v-phase voltage command vv*, and the w-phase voltage command vw* on the coordinate system that is at rest with respect to the AC rotating machine 1. Then, the rotational position estimation unit 20 may compute the rotational position $\theta$ similarly based on the output torque Tm, and on the u-phase high-frequency voltage Avu, the v-phase high-frequency voltage Avv, and the w-phase high-frequency voltage Avw.

In this case, as with the d-axis correlation value Zd expressed by Expression (5), the estimation error computation unit 22 computes a cross-correlation function of each of the u-phase high-frequency voltage Avu, the v-phase high-frequency voltage Avv, and the w-phase high-frequency voltage Avw, and the output torque high frequency Tmhf to compute a u-phase correlation value Zu, a v-phase correlation value Zv, and a w-phase correlation value Zw.

Further, by converting the u-phase correlation value Zu, the v-phase correlation value Zv, and the w-phase correlation value Zw to an $\alpha$-axis correlation value Z$\alpha$ and a $\beta$-axis correlation value Z$\beta$, which correspond on the $\alpha$-$\beta$ axes constructing the orthogonal rest coordinate system and dividing by the $\alpha$-axis correlation value Z$\alpha$ and the $\beta$-axis correlation value Z$\beta$ to compute an arc tangent of a division value (Z$\alpha$/Z$\beta$), the rotational position $\theta$, which is the phase difference between the $\alpha$-$\beta$ axes of the rest coordinate system and the actual d-q axes, may be calculated.

Operation Example 4

The rotational position estimation unit 20 may be configured to compute the rotational position $\theta$ based on a double frequency component of the angular frequency wh of the torque Tm' expressed by Expression (3), and on the d-axis high-frequency current and the q-axis high-frequency current, which have a double frequency of the angular frequency wh. In other words, as expressed by Expression (3), the torque Tm' is formed of a first sine wave having the angular frequency wh and a second sine wave having the double frequency of the angular frequency wh, and the second sine wave is used instead of the first sine wave.

In this case, the output torque high frequency generation unit 21 extracts only a signal near the double frequency of the angular frequency wh from the torque Tm' to generate an output torque high frequency Tmhf' corresponding to the double frequency of the angular frequency wh. Therefore, the rotational position estimation unit 20 may compute the rotational position $\theta$ similarly based on the output torque high frequency Tmhf', and on the d-axis high-frequency current and the q-axis high-frequency current, which have the double frequency of the angular frequency wh.

As described above, according to the first embodiment of the present invention, the control device for an AC rotating machine includes the AC rotating machine, a power feeder for supplying electric powers to the AC rotating machine, torque detection means for detecting the output torque of the AC rotating machine, and rotational position estimation means for estimating the rotational position of the AC rotating machine, and has the features in that the power feeder adds predetermined high-frequency currents or high-frequency voltages to desired currents or voltages to be supplied to the AC rotating machine, and in that the rotational position estimation means estimates the rotational position based on the high-frequency component contained in the output torque and the high-frequency components corresponding to the high-frequency currents or voltages. In this manner, there may be provided the control device for an AC rotating machine, which is capable of estimating the rotational position of the AC rotating machine without being constrained by the rotational speed of the AC rotating machine, whether or not the AC rotating machine is electrically salient, and whether or not the magnetic saturation has occurred, and the AC rotating machine drive system and the electric power steering system each including the control device for an AC rotating machine.

Second Embodiment

In the first embodiment described above, there has been described the control device for an AC rotating machine, which includes the rotational position estimation unit 20 for estimating the rotational position θ based on the output torque Tm of the AC rotating machine 1, and on the d-axis high-frequency current Aid and the q-axis high-frequency current Aiq. In contrast, in a second embodiment of the present invention, a description is given of a control device for an AC rotating machine, which includes a rotational position estimation unit 20a for estimating the rotational position θ further in consideration of the number of revolutions of the AC rotating machine 1.

Here, the control device for an AC rotating machine according to the second embodiment outputs a first rotational position θ1 as the rotational position θ as in the first embodiment described above in a case where a rotational speed w of the AC rotating machine 1 is below a predetermined value (below a predetermined number of revolutions), and in contrast, outputs a second rotational position θ2, which is calculated based on an induced voltage of the AC rotating machine 1, as the rotational position θ in a case where the rotational speed w is the predetermined value or larger (the predetermined number of revolutions or higher).

This leads to a technical feature in that, in the case where the rotational speed w of the AC rotating machine 1 is low or stopped (corresponding to the case of being below the predetermined value), as in the first embodiment described above, the rotational position θ may be estimated accurately, and in the case where the rotational speed w is high so as to be larger than the frequency of the d-axis high-frequency current Aid and the q-axis high-frequency current Aiq (corresponding to the case of being the predetermined value or larger), the rotational position θ may be estimated more accurately as compared to the first embodiment described above.

Figure 3:
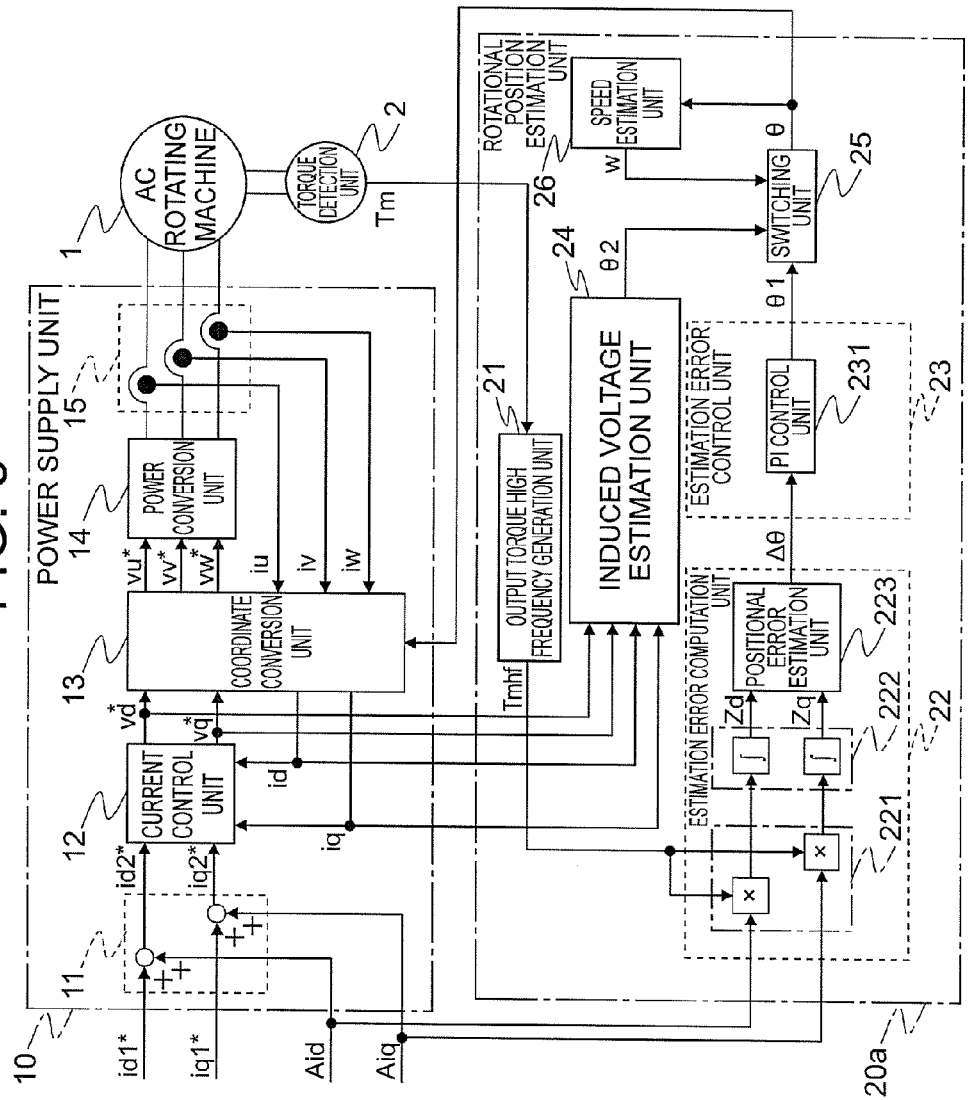
FIG. 3 is a configuration diagram illustrating a control device for an AC rotating machine according to a second embodiment of the present invention.

FIG. 3 is a configuration diagram illustrating the control device for an AC rotating machine according to the second embodiment of the present invention. The control device for an AC rotating machine in FIG. 3 includes the power supply unit 10 and the rotational position estimation unit 20a. The rotational position estimation unit 20a also includes the output torque high frequency generation unit 21, the estimation error computation unit 22, the estimation error control unit 23, an induced voltage estimation unit 24, a switching unit 25, and a speed estimation unit 26.

Here, when the components forming the control device for an AC rotating machine in FIG. 3 are compared to those of the control device for an AC rotating machine in FIG. 1 described above, the rotational position estimation unit 20a is used instead of the rotational position estimation unit 20. Moreover, it can be seen that, as compared to the rotational position estimation unit 20, the rotational position estimation unit 20a is newly added with the induced voltage estimation unit 24, the switching unit 25, and the speed estimation unit 26. Note that, in the configuration illustrated in FIG. 3, functional components and operations other than the induced voltage estimation unit 24, the switching unit 25, and the speed estimation unit 26 are equivalent to those described above in the first embodiment, and hence a detailed description thereof is omitted.

In the control device for an AC rotating machine in FIG. 3, the output torque high frequency generation unit 21, the estimation error computation unit 22, and the estimation error control unit 23 perform operations similar to those of the first embodiment described above. In this case, the estimation error control unit 23 may compute the first rotational position θ1 (in the second embodiment, the rotational position computed by the estimation error control unit 23 is referred to as "first rotational position θ1").

Moreover, the induced voltage estimation unit 24 estimates the induced voltage generated by the AC rotating machine 1 based on the d-axis voltage command vd* and the q-axis voltage command vq*, which are output by the current control unit 12, and on the d-axis detected current id and the q-axis detected current iq, which are output by the coordinate conversion unit 13, by a well-known method using an adaptive observer and an integrator (described in, for example, Patent Literature 1) so as to compute the second rotational position θ2 (in the second embodiment, the rotational position computed by the induced voltage estimation unit 24 is referred to as "second rotational position θ2").

Note that, for example, the induced voltage estimation unit 24 may estimate the induced voltage based on voltage commands and detected currents in an arbitrary coordinate system such as the u-phase voltage command vu*, the v-phase voltage command vv*, and the w-phase voltage command vw*, which are output by the coordinate conversion unit 13, and the u-phase detected current iu, the v-phase detected current iv, and the w-phase detected current iw, which are detected by the current detection unit 15.

The switching unit 25 outputs the rotational position θ based on the first rotational position θ1, which is output by the estimation error control unit 23, on the second rotational position θ2, which is output by the induced voltage estimation unit 24, and on the rotational speed w, which is output by the speed estimation unit 26 to be described later. More specifically, the switching unit 25 selects the first rotational position θ1 in the case where the rotational speed w is below the predetermined value, and the second rotational position θ2 in the case where the rotational speed w is the predetermined value or larger, and outputs the selected rotational position as the rotational position θ. Note that, the predetermined value may be defined in advance.

The speed estimation unit 26 differentiates the rotational position θ, which is output by the switching unit 25, to compute the rotational speed w of the AC rotating machine 1, and outputs the rotational speed w to the switching unit 25. Note that, in the case where the rotational speed w is zero (when the AC rotating machine 1 is stopped), the switching unit 25 selects the first rotational position θ1 as a default.

In this manner, in the case where the rotational speed w is below the predetermined value, as in the first embodiment described above, the rotational position estimation unit 20a outputs the rotational position θ1, which is calculated based on the output torque Tm, and on the d-axis high-frequency current Aid and the q-axis high-frequency current Aiq. In contrast, in the case where the rotational speed w is the predetermined value or larger, the rotational position estimation unit 20 outputs the rotational position θ2, which is computed based on the induced voltage of the AC rotating machine 1.

In other words, the rotational position estimation unit 20a computes the rotational position θ corresponding to the rotational speed w of the AC rotating machine 1 based on the output torque Tm, on the d-axis high-frequency current Aid and the q-axis high-frequency current Aiq, on the d-axis detected current id and the q-axis detected current iq, and on the d-axis voltage command vd* and the q-axis voltage command vq*, and outputs the rotational position θ to the power supply unit 10.

Note that, the induced voltage estimation unit 24 computes the second rotational position θ2 by the well-known method using the adaptive observer and the integrator. However, the present invention is not limited thereto, and the induced voltage estimation unit 24 may compute the second rotational position θ2 based on induced voltage estimation by another well-known method.

Moreover, in the case where the switching unit 25 selects the second rotational position θ2 as the rotational position θ, the computation of the first rotational position θ1 becomes unnecessary, and hence the power supply unit 10 may stop the superimposition of the d-axis high-frequency current Aid and the q-axis high-frequency current Aiq. In this case, it is possible to minimize the effects caused by those high-frequency currents supplied to the AC rotating machine 1.

As described above, according to the second embodiment of the present invention, the control device for an AC rotating machine has the following features. The control device for an AC rotating machine estimates the rotational position based on both the rotational position that is calculated based on the high-frequency component contained in the output torque and the high-frequency components corresponding to the high-frequency currents or voltages, and the rotational position that is calculated based on the induced voltage of the AC rotating machine. Further, the control device for an AC rotating machine uses the rotational position that is calculated based on the induced voltage of the AC rotating machine only in the case where the AC rotating machine operates at the predetermined number of revolutions or higher. In other words, the first rotational position is adopted in the case where the rotational speed of the AC rotating machine is low or stopped, and the second rotational position is adopted in the case where the rotational speed is high and is larger than the frequency of the d-axis high-frequency current and the q-axis high-frequency current, with the result that the rotational position may be estimated accurately over a wide speed range.

Third Embodiment

In the first and second embodiments described above, the control device for an AC rotating machine has been described. In contrast, in a third embodiment of the present invention, a description is given of an AC rotating machine drive system including the control device for an AC rotating machine in the second embodiment described above. Note that, the AC rotating machine drive system in the third embodiment may include, instead of the control device for an AC rotating machine in the second embodiment described above, the control device for an AC rotating machine in the first embodiment described above. Moreover, in the third embodiment, for a description with specific examples, a description is given of an electric powering system, which is an example of the AC rotating machine drive system.

Here, the AC rotating machine 1 in the electric power steering system is required to operate stably over the entire operation range of the AC rotating machine 1. Further, in a case where a driver operates, smooth steering performance and quietness are required, and hence it is preferred to use the cylindrical AC rotating machine 1 having a small torque ripple. Therefore, when the control device for an AC rotating machine in each of the first and second embodiments is applied to the electric power steering system, the rotational position θ may be estimated stably and accurately regardless of the number of revolutions of the AC rotating machine 1, whether or not the AC rotating machine 1 is salient, and whether or not the magnetic saturation has occurred, and hence advantageous effects as compared to the related art may be obtained.

Moreover, in the first and second embodiments described above, the case where the torque detection unit 2 detects the output torque Tm directly on an output shaft of the AC rotating machine 1 has been described. In contrast, in the case where the control device for an AC rotating machine in the first and second embodiments described above is applied to a general electric power steering system, the torque detection unit 2 does not detect the output torque Tm directly on the output shaft of the AC rotating machine 1. Therefore, in the third embodiment, as opposed to the first and second embodiments described above, the output torque Tm detected by the torque detection unit 2 does not match an output torque applied to the output shaft of the AC rotating machine 1 (hereinafter referred to as "output torque Tm0 of the AC rotating machine 1"). Moreover, there is a predetermined phase difference θ0, which depends on a frequency of the torque, between the output torque Tm and the output torque Tm0.

Therefore, in a case of estimating the rotational position θ more accurately, the predetermined phase difference θ0 needs to be considered. In the third embodiment, the electric power steering system capable of estimating the rotational position θ more accurately by considering the predetermined phase difference θ0 is described with specific examples.

Figure 4:
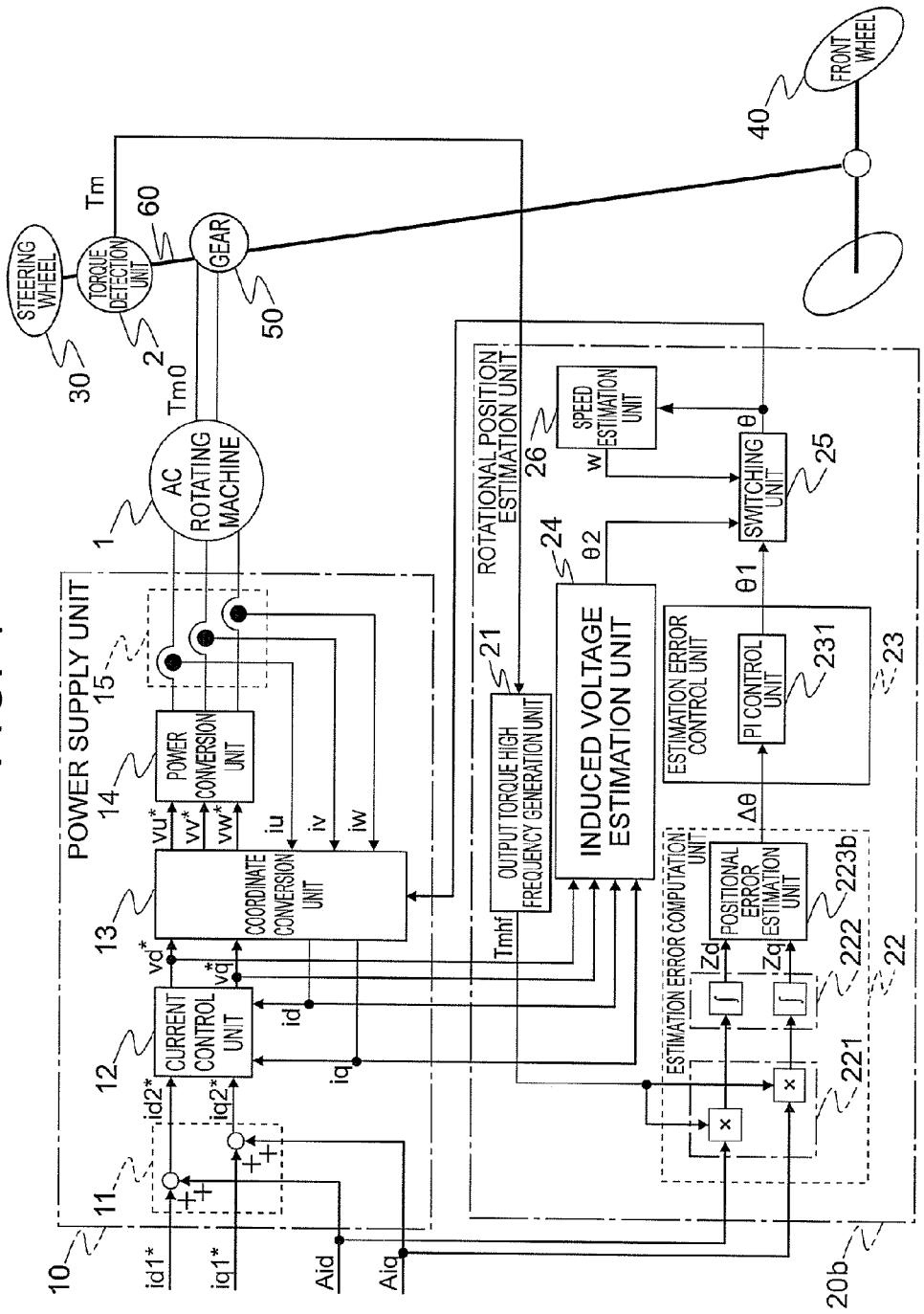
FIG. 4 is a configuration diagram illustrating an electric power steering system according to a third embodiment of the present invention.

FIG. 4 is a configuration diagram illustrating the electric power steering system in the third embodiment of the present invention. The electric power steering system in FIG. 4 includes the AC rotating machine 1, the torque detection unit 2, the power supply unit 10, a rotational position estimation unit 20b, a steering wheel 30, front wheels 40, a gear 50, and a transmission shaft 60.

Here, as to the components constructing the electric power steering system in FIG. 4, functional components and operations of the AC rotating machine 1, the torque detection unit 2, and the power supply unit 10 are equivalent to those described above in the first and second embodiments, and hence a detailed description thereof is omitted. Moreover, in the rotational position estimation unit 20b, as compared to the rotational position estimation unit 20a in the second embodiment described above, a positional error estimation unit 223b is used instead of the positional error estimation unit 223. Note that, in the rotational position estimation unit 20b, functional components and operations other than the positional error estimation unit 223b are equivalent to those described above in the first and second embodiments, and hence a detailed description thereof is omitted.

The driver turns the steering wheel 30 to the right and left to steer the front wheels 40. The gear 50 transmits the output torque Tm0 of the AC rotating machine 1 to the transmission shaft 60. The transmission shaft 60 transmits the transmitted output torque of the AC rotating machine to the steering wheel 30 and the front wheels 40 to assist the driver in steering. The torque detection unit 2 is connected to the transmission shaft 60, detects the output torque of the AC rotating machine on the transmission shaft 23, which is transmitted from a torsion of a torsion bar constructing the torque detection unit 2 via the gear 22, and the output torque Tm based on a steering torque of the driver, and outputs the output torque Tm to the rotational position estimation means 9b.

Moreover, the multiplication unit 221 and the integration unit 222 of the estimation error computation unit 22 perform similar operations as in the first and second embodiments described above. In this case, the positional error estimation unit 223b divides the d-axis correlation value Zd, which is output by the integration unit 222, by the q-axis correlation value Zq to compute the arc tangent of the division value. Further, the positional error estimation unit 223b subtracts the predetermined phase difference θ0 from the computed value to compute the rotational position estimation error Δθ, and outputs the rotational position estimation error Δθ to the estimation error control unit 23. Note that, the predetermined phase difference θ0 is described later.

Moreover, the frequency of the d-axis high-frequency current Aid and the q-axis high-frequency current Aiq, which are input to the power supply unit 10, is set to be a frequency that is sufficiently higher than the frequency of the steering torque Th generated by the driver, further, sufficiently higher than a resonance frequency resulting from inertia of the AC rotating machine 1, inertia of the steering wheel 30, and rigidity of the transmission shaft 60, and sufficiently lower than 500 Hz, which is a general control response in generating the d-axis voltage command vd* and the q-axis voltage command vq* by the current control unit. Therefore, it is preferred that the frequency of the d-axis high-frequency current Aid and the q-axis high-frequency current Aiq be set, in particular, in a range of from 20 Hz or higher to 300 Hz or lower.

Figure 5:
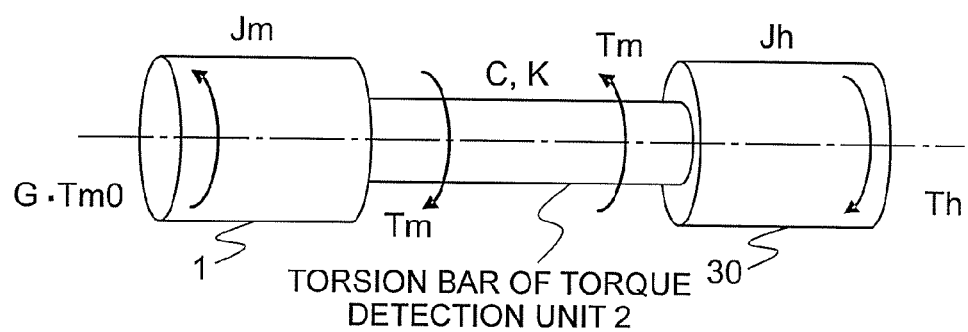
FIG. 5 is an explanatory diagram illustrating a relationship of torques respectively applied to an AC rotating machine, a steering wheel, and a transmission shaft according to the third embodiment of the present invention.
Figure 6:
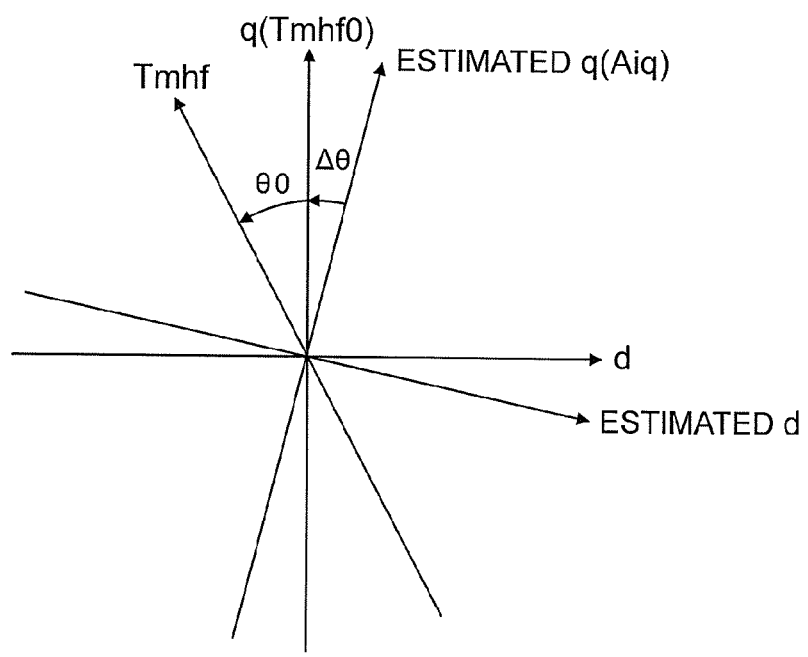
FIG. 6 is an explanatory diagram showing a phase relationship of an output torque high frequency corresponding to a torque applied to an output shaft of the AC rotating machine and an output torque high frequency corresponding to a torque detected by a torque detection unit according to the third embodiment.

Next, the computation method with which the positional error estimation unit 223b computes the rotational position estimation error Δθ by subtracting the predetermined phase difference θ0 is described with reference to FIGS. 5 and 6. FIG. 5 is an explanatory diagram illustrating a relationship of torques respectively applied to the output shaft of the AC rotating machine 1, the steering wheel 30, and the transmission shaft 60 according to the third embodiment of the present invention. FIG. 6 is an explanatory diagram showing a phase relationship of an output torque high frequency Tmhf0 corresponding to the output torque Tm0 applied to the output shaft of the AC rotating machine 1 and the output torque high frequency Tmhf corresponding to the output torque Tm detected by the torque detection unit 2 according to the third embodiment.

In FIG. 5, the relationship of the torques respectively applied to the AC rotating machine 1, the steering wheel 30, and the torsion bar constructing the torque detection unit 2 is illustrated by a mechanically equivalent structure. Here, the transmission shaft 60 is assumed to be sufficiently rigid as compared to the torsion bar constructing the torque detection unit 2, and is ignored. FIG. 5 also illustrates a moment of inertia Jm of the AC rotating machine 1, the output torque Tm0 applied to the output shaft of the AC rotating machine 1, a moment of inertia Jh of the steering wheel 30, the steering torque Th generated by the driver, a gear ratio G of the gear 50, the output torque Tm applied to the transmission shaft 60, an attenuation coefficient C of the torsion bar constructing the torque detection unit 2, and a spring constant K of the torsion bar constructing the torque detection unit 2.

Here, the relationship of the output torque Tm, the output torque Tm0, and the steering torque Th is expressed as Expression (10).

$$Tm = \left(C + \frac{K}{s}\right)\left(\frac{GTm0}{Jms} - \frac{Th}{Jhs}\right) \quad (10)$$

Moreover, the frequency of the d-axis high-frequency current Aid and the q-axis high-frequency current Aiq, which are input to the power supply unit 10, is set to be the frequency that is sufficiently higher than the frequency of the steering torque Th as described above. Therefore, in Expression (10), in a case where the angular frequency wh component of the output torque Tm0 is referred to as "output torque high frequency Tmhf0", and the angular frequency wh component of the output torque Tm is referred to as "output torque high frequency Tmhf", the output torque high frequency Tmhf is expressed as Expression (11).

$$Tmhf = \frac{G}{Jms}\left(C + \frac{K}{s}\right)Tmhf0 \quad (11)$$

Moreover, each of the gear ratio G, the moment of inertia Jm, the attenuation coefficient C, and the spring constant K in Expression (11) is a constant representing a mechanical characteristic of the gear 50, the AC rotating machine 1, and the transmission shaft 60. Therefore, it can be seen that the phase difference between the output torque high frequency Tmhf0 and the output torque high frequency Tmhf depends only on the frequency of the d-axis high-frequency current Aid and the q-axis high-frequency current Aiq. The phase difference between the output torque high frequency Tmhf0 and the output torque high frequency Tmhf becomes the predetermined phase difference θ0 described above. Note that, a value of the predetermined phase difference θ0 is determined based on the frequency of the d-axis high-frequency current Aid and the q-axis high-frequency current Aiq.

Moreover, in FIG. 6, as in FIG. 2 described above, the phase relationship of the actual d-q axes and the estimated d-q axes is shown, and the phase difference between those axes is the rotational position estimation error Δθ. FIG. 6 further shows the phase relationship of the output torque high frequency Tmhf0 corresponding to the output torque Tm0 applied to the output shaft of the AC rotating machine 1, and the output torque high frequency Tmhf corresponding to the output torque Tm detected by the torque detection unit 2.

Here, the output torque high frequency Tmhf0 corresponds to the output torque Tm0 applied to the output shaft of the AC rotating machine 1, and hence is located on the q axis on the actual d-q axes having the phase difference from the estimated d-q axes of Δθ as shown in FIG. 6. Moreover, as described above, the phase difference between the output torque high frequency Tmhf0 and the output torque high frequency Tmhf is the predetermined phase difference θ0, and hence as shown in FIG. 6, the output torque high frequency Tmhf is located at a position rotated by the predetermined phase difference θ0 from the q axis on which the output torque high frequency Tmhf0 is located.

In this manner, the positional error estimation unit 223b may compute the rotational position estimation error Δθ more accurately by computing the arc tangent of the division value obtained by dividing the correlation value Zd, which is output by the integration unit 222, by the correlation value Zq, and subtracting the predetermined phase difference θ0 from the computed value. Therefore, the rotational position estimation unit 20 may compute the rotational position θ based on the output torque Tm, which is detected by the torque detection unit 2, and on the d-axis high-frequency current Aid and the q-axis high-frequency current Aiq as in the first and second embodiments described above.

Therefore, the electric power steering system may assist the driver in steering stably in the entire operation range of the AC rotating machine 1 without using the position sensor. Further, the predetermined phase difference θ that exists between the output torque Tm0 in the output shaft of the AC rotating machine 1 and the output torque Tm detected by the torque detection unit 2 is considered, with the result that the rotational position estimation unit 20 may estimate the rotational position θ more accurately.

Moreover, in the case where the frequency of the d-axis high-frequency current Aid and the q-axis high-frequency current Aiq is the frequency that is sufficiently higher than the resonance frequency resulting from the inertia of the AC rotating machine 1, the inertia of the steering wheel 30, and the rigidity of the transmission shaft 60, and is set in the range of from 20 Hz or higher to 300 Hz or lower so as to be sufficiently lower than 500 Hz, which is the general control response in generating the d-axis voltage command vd* and the q-axis voltage command vq* by the current control unit, the rotational position estimation unit 20 may estimate the rotational position θ more accurately. Further, in a case of minimizing interference of the estimation accuracy of the rotational position θ in the rotational position estimation unit 20 with the current control unit, it is preferred that the frequency of the d-axis high-frequency current Aid and the q-axis high-frequency current Aiq be set in a range of from 20 Hz or higher to 150 Hz or lower. In other words, vibration of the AC rotating machine 1 caused by the high-frequency powers supplied to the AC rotating machine 1 may be minimized. Therefore, the operation of the AC rotating machine 1 is not affected, with the result that the rotational position estimation unit 20 may estimate the rotational position θ more accurately.

Note that, in the third embodiment, the electric power steering system has been exemplified for description, but the steering wheel 30, which is a load on the rotation, may be substituted by a moment of inertia other than the steering wheel, and similar effects may be obtained also when the control device for an AC rotating machine in each of the first and second embodiments is applied to a system of an apparatus that is known as a so-called two-inertia system other than the electric power steering.

As described above, according to the third embodiment of the present invention, the control device for an AC rotating machine, which is applied to the AC rotating machine drive system, may estimate the rotational position stably and accurately without using the position sensor and without being constrained by the number of revolutions of the AC rotating machine, whether or not the AC rotating machine is salient, and whether or not the magnetic saturation has occurred. In this manner, it is possible to provide the AC rotating machine drive system that ensures excellent steering performance and high safety.

Note that, in the third embodiment, the case where the electric power steering system, which is an example of the AC rotating machine drive system, does not include the position sensor has been described. However, the present invention is not limited thereto, and the electric power steering system may include the position sensor. More specifically, for example, under normal conditions, the rotational position may be detected by the position sensor, and under specific conditions such as a case where the position sensor has failed, the control device for an AC rotating machine may estimate the rotational position.

In this manner, under the normal conditions, the position sensor detects the rotational position, and in the case where the position sensor has failed, the control device for an AC rotating machine may estimate the rotational position, with the result that even after the position sensor has failed, driving may be continued safely.

REFERENCE SIGNS LIST

1 AC rotating machine, 2 torque detection unit, 10 power supply unit, 11 high-frequency superimposing unit, 12 current control unit, 13 coordinate conversion unit, 14 power conversion unit, 15 current detection unit, 20, 20a, 20b rotational position estimation unit, 21 output torque high frequency generation unit, 22 estimation error computation unit, 23 estimation error control unit, 24 induced voltage estimation unit, 25 switching unit, 26 speed estimation unit, 30 steering wheel, 40 front wheel, 50 gear, 60 transmission shaft, 221 multiplication unit, 222 integration unit, 223, 223b positional error estimation unit, 231 PI control unit.

The invention claimed is:

1. A control device for an AC rotating machine, comprising:
the AC rotating machine;
a power supply unit for supplying electric powers to the AC rotating machine;
a torque detection unit for detecting an output torque of the AC rotating machine; and
a rotational position estimation unit for estimating a rotational position of the AC rotating machine,
wherein the power supply unit adds predetermined high-frequency powers to desired electric powers to be supplied to the AC rotating machine, and
wherein the rotational position estimation unit estimates the rotational position based on a high-frequency component contained in the output torque detected by the torque detection unit and high-frequency components corresponding to the high-frequency powers.

2. A control device for an AC rotating machine according to claim 1, wherein the power supply unit supplies the high-frequency powers onto rotation coordinate axes that rotate in synchronization with the rotational position.

3. A control device for an AC rotating machine according to claim 1, wherein the power supply unit supplies the high-frequency powers onto orthogonal coordinate axes at rest.

4. A control device for an AC rotating machine according to claim 1, wherein the high-frequency components corresponding to the high-frequency powers comprise high-frequency currents.

5. A control device for an AC rotating machine according to claim 1, wherein the predetermined high-frequency powers added by the power supply unit comprise high-frequency currents.

6. A control device for an AC rotating machine according to claim 1, wherein the rotational position estimation unit estimates the rotational position based on both the rotational position that is calculated based on the high-frequency component contained in the output torque and the high-frequency components corresponding to the high-frequency powers, and the rotational position that is calculated based on an induced voltage of the AC rotating machine.

7. An AC rotating machine drive system, comprising:
the control device for an AC rotating machine according to claim 1;
a transmission shaft for transmitting the output torque of the AC rotating machine; and
a load on rotation to which the output torque of the AC rotating machine is applied via the transmission shaft,
wherein the predetermined high-frequency powers added by the power supply unit have a frequency that is higher than a resonance frequency resulting from inertia of the AC rotating machine of the AC rotating machine drive system, inertia of the load on rotation, and rigidity of the transmission shaft.

8. A control device for an AC rotating machine according to claim 2, wherein the rotational position estimation unit comprises:
an estimation error computation unit for outputting a rotational position estimation error, which is an error of an estimated rotational position, based on the high-frequency component contained in the output torque and high-frequency currents corresponding to the high-frequency powers; and
an estimation error control unit for calculating the rotational position so that the rotational position estimation error becomes zero, and outputting the rotational position.

9. A control device for an AC rotating machine according to claim 3, wherein the rotational position estimation unit comprises:
a multiplication unit for multiplying the high-frequency component contained in the output torque and each of axial components of the orthogonal coordinate axes at rest of the high-frequency currents corresponding to the high-frequency powers;
an integration unit for integrating each of outputs of the multiplication unit over an interval that is longer than at least a period of the high-frequency powers; and
a positional error estimation unit for calculating the rotational position from a relationship of outputs of the integration unit based on an arc tangent function.

10. A control device for an AC rotating machine according to claim 4, wherein the high-frequency currents corresponding to the high-frequency powers comprise current commands.

11. A control device for an AC rotating machine according to claim 6, wherein the rotational position estimation unit uses the rotational position that is calculated based on the induced voltage of the AC rotating machine only in a case where the AC rotating machine operates at a predetermined number of revolutions or higher.

12. An electric power steering system, comprising the AC rotating machine drive system according to claim 7,
wherein the predetermined high-frequency powers added by the power supply unit have a frequency in a range of from 20 Hz or higher to 300 Hz or lower.

13. A control device for an AC rotating machine according to claim 8, wherein the estimation error computation unit comprises:
a multiplication unit for multiplying the high-frequency component contained in the output torque and each of axial components of the rotation coordinate axes that rotate in synchronization with the estimated rotational position of the high-frequency currents corresponding to the high-frequency powers;
an integration unit for integrating each of outputs of the multiplication unit over an interval that is longer than at least a period of the high-frequency powers; and
a positional error estimation unit for calculating the rotational position estimation error from a relationship of the outputs of the integration unit based on an arc tangent function.

14. A control device for an AC rotating machine according to claim 9, wherein a positional error estimation unit outputs a value as a rotational position estimation error, the value being obtained by adding or subtracting a predetermined value to or from a position, which is calculated from the relationship of the outputs of the integration unit based on the arc tangent function.

15. A control device for an AC rotating machine according to claim 13, wherein a positional error estimation unit outputs a value as a rotational position estimation error, the value being obtained by adding or subtracting a predetermined value to or from a position, which is calculated from the relationship of the outputs of the integration unit based on the arc tangent function.

* * * * *